United States Patent Office

3,696,071
Patented Oct. 3, 1972

3,696,071
MANUFACTURE OF POLYETHYLENE
TEREPHTHALATE
Brian A. Dementi, Richmond, Va., assignor to Allied
Chemical Corporation, New York, N.Y.
No Drawing. Filed July 30, 1970, Ser. No. 59,685
Int. Cl. C08g 17/015, 39/04
U.S. Cl. 260—45.75 C
9 Claims

ABSTRACT OF THE DISCLOSURE

The preparation of linear high-molecular weight, film and fiber forming polyester and copolyesters wherein the reaction of polycarboxylic acid with a polyol takes place in the presence of cuprous and cupric inorganic salts to improve processing and end product characteristics.

BACKGROUND OF THE INVENTION

Field of the invention

This invention relates to a process for preparing linear high-molecular weight polyesters. More particularly, it relates to an improved process for directly preparing polyesters and copolyesters in the presence of a mixture of cuprous and cupric inorganic salts which can then be polycondensed into high molecular weight and high quality linear polyesters or copolyesters suitable for further processing into shaped articles, such as, fibers and films useful in preparing textile and industrial articles of commerce.

Description of the prior art

It is conventional to prepare linear high-molecular weight polyesters on a commercial scale either by the ester interchange reaction between dimethyl terephthalate and a polyol or by a direct esterification process first disclosed by Whinfield and Dickson in 1941 and illustrated in U.S. Pat. 2,465,310. This initial direct esterification process was not entirely satisfactory as lengthy refluxing of the acid and glycol was necessary to obtain a solution. Many improvements have been made upon the Whinfield and Dickson process, some of which are illustrated in U.S. Pats. 3,050,533, 3,427,287 and 3,484,410. And, although many improvements have been made in the direct esterification route for preparing linear high-molecular weight polyesters to the extent that some commercial use is now made of this process, many problems still exist in the processing of the polyester, as well as obtaining the necessary physical properties of the finished polyester for certain end uses. Another improvement is disclosed by Taylor in U.S. Pat. 3,446,766, granted May 27, 1969. This patent discloses a process for preparing improved polyester fibers having very low concentrations of free-carboxyl-group contents by adding a copper salt of an organic carboxylic acid and a molar excess of alkali metal iodide to a fully polymerized, molten polyester prior to melt spinning. Such polyester having low free-carboxyl-group contents gives superior performance when used in articles where heat-degradation is a problem. Another known necessary improvement to yield superior performance when used in commercial articles where heat-degradation is a problem includes suppressing undesirable side reactions such as ether linkages as such linkages affect a reduction of the polymeric polyester's softening point, light resistance, heat resistance, oxidation resistance, and, when the polymer is shaped into yarn and dyed, its dye light fastness. In short, excess ether groups in the final polymeric polyester make such unsatisfactory for use in textile end uses, such as, filaments and fibers as well as in films. Other problems are observed in the direct esterification reaction as when the reaction is carried out too slowly, thus allowing these side linkages to increase. Therefore, it is necessary to catalyze the reaction to control the processing time in order to control the product quality.

It would indeed be a worthwhile contribution to have an additive that not only yields thermal and aminolytic stability to the finished polymeric polyester but also as a catalyst during the direct esterification reaction. Such, to a great degree, encompasses this invention.

SUMMARY OF THE INVENTION

The present invention provides an efficient and convenient method for more readily preparing polyester shaped structures which are useful in many textile and industrial applications having high thermal and aminolytic stabilization characteristics. Furthermore, the invention provides polyester fibers which have excellent resistance when embodied in articles where heat-degradation is a problem. Further, an important advantage is the usefulness of one additive that not only yields thermal and aminolytic stability to the finished polymeric polyester but also acts as a catalyst during the direct esterification reaction wherein the product is prepared.

A prime object of this invention is to provide new and useful linear, high-molecular weight polyesters and copolyesters having valuable properties, including that of being capable of being formed into useful items of commerce, such as, filaments, fibers and films.

Another object of this invention is a catalytic process for the esterification of aromatic dicarboxylic acid with a polyol under direct esterification conditions.

A further object of this invention is to provide an additive for the direct esterification reaction of an aromatic dicarboxylic acid with a polyol which improves the thermal and aminolytic stability of the polyester.

A still further object of this invention is to provide an additive mixture of cuprous and cupric inorganic halide salts for the direct esterification reaction of an aromatic dicarboxylic acid with a polyol which acts both as a catalyst in said reaction and as a thermal and aminolytic stabilizer of the polymer polyester. Other objects will become apparent in the course of the following detailed description.

In accordance with the above objects, it has now been discovered that rapid reaction rates in the preparation of polyester by the direct esterification route or by the ester-interchange route can be obtained while at the same time improving the thermal and aminolytic stability of the polyester. Accordingly, the present invention is the preparation of a linear high-molecular weight, film and fiber polyester and copolyesters by reacting an aromatic dicarboxylic acid and/or the lower alkyl esters thereof with a polyol containing 2 to about 10 carbon atoms per molecule under direct esterification conditions in the presence of an equimolar mixture of cuprous and cupric inorganic salts in an amount sufficient to catalyze said reaction and to improve the thermal and aminolytic stabilization of said polyester.

The direct esterification of the aromatic dicarboxylic acid and/or the lower alkyl esters thereof and the polyol can start at a temperature as low as 200° C. and range up to 300° C. and at atmospheric and superatmospheric pressures ranging up to 500 p.s.i.g. The direct esterification or ester-interchange reaction is carried out in the absence of oxygen-containing gas. More preferably, the reaction temperature ranges from about 230° C. to about 280° C. and at a pressure, when superatmospheric pressure is employed, ranging from about 50 to about 250 p.s.i.g. The actual reaction times will vary depending upon the reaction temperature and pressure. The amount of polyol is reacted with the aromatic dicarboxylic acid and/ or the lower alkyl ester thereof in an amount ranging from about 1 to about 3 moles of polyol per mole of acid. The amount of the equimolar cuprous and cupric inorganic salt mixture present during the direct esterification reaction ranges generally from about 10 to about 150 parts per million, and preferably from about 50 to about 100 parts per million based on the polyester. The mixture of cuprous and cupric inorganic salt can be added prior to or during the direct esterification reaction.

Various other additives may be added before, during, or after direct esterification reaction in order to further control or tailor the reactions in order to obtain required characteristics of the final polymer for specific end uses. As, for example, if fatigue resistance is desirable, a small amount of diphenylene phenylene diamine can be added. Additives can also be added to control such characteristics of the finished polymer as heat and light stability, dye uptake, adhesion, static dissipation, luster, flammability, dyestuff precursors and assistants, low free carboxyl content, brighteners, fluorescent agents, ether formation suppressants and the like.

The condensation or polymerization of the material obtained by the direct esterification or ester-interchange reaction between aromatic dicarboxylic acid with a polyol is usually carried out at a reduced pressure which can be as low as 0.1 torr and a temperature in the range of from about 260° C. to about 300° C. This part of the reaction is carried out under these conditions for periods of about 1.0 to about 10 hours and preferably from about 2 to about 6 hours until a polymerized polyester product of the required molecular weight as determined by viscosity or other convenient physical measurement is obtained. The duration of such periods depends upon many factors, such as the polymerization conditions set up for the process, such as, pressure and temperature profiles, surface generation conditions, ingredient mole ratios, catalyst concentration, additives utilized, requisite viscosity, etc. Any excess glycol and other by-products are removed more easily by utilizing continuous agitation of the mass while simultaneously exposing said mass to a predetermined vacuum.

The catalyst and stabilizer that can be utilized in carrying out the objectives of this invention are the cuprous and cupric mixture of inorganic salts. The equimolar cuprous and cupric mixture of the halogen salts is preferred with the cuprous and cupric mixture of chlorine salts being most preferred. Surprisingly, it has now been found that a mixture of equimolar cuprous and cupric inorganic halide salts yields a catalytic effect to the direct esterification process wherein an aromatic dicarboxylic acid is reacted with a polyol as well as a thermal and aminolytic stabilizer effect to a fiber and film polyester made by such process.

Many tests are utilized for the evaluation of thermal or heat stability of cords for reinforcing rubber articles. One such test, commonly referred to as the heat stability test, measures the percentage strength retention of tire cord which has been subjected to an elevated temperature in a hermetically sealed glass tube and essentially consists of taking a 2.0 gram sample of the cord to be tested and subjecting said cord to moisture equilibrium at 55% relative humidity and 75° F. then sealing it into an approximately 29 cm.³ glass tube and heating to a temperature of 300° F. for forty-eight hours, after which the residual tensile strength of the cord is determined and its percentage strength retention calculated relative to an untreated control sample of the same material and the same weight. Each sample is tested five times and a statistical average of the percentage strength retention of the tire cord based upon the initial strength of the cord as 100%.

The following examples are illustrative of various embodiments of the present invention but are not construed as limiting the invention in any way. The parts of ingredients are expressed as stated in the examples.

EXAMPLE 1

Three pounds (1359 grams) of polyethylene terephthalate polymer pellets prepared either by an ester-interchange or direct esterification reaction route and having an intrinsic viscosity of 0.87 are coated with cupric chloride by evaporation over the pellets of a methanol solution containing 0.125 gram of cupric chloride dihydrate. This amount is equivalent to 50 p.p.m. copper based upon the quantity of polymer. This polymer is then melt spun to obtain a yarn having an intrinsic viscosity of about 0.75. A second yarn sample is prepared by repeating this procedure with the exception that 0.07 gram of cuprous chloride is used containing three drops of concentrated hydrochloric acid to help effect solution. The hydrochloric acid is used only to help expedite a solution and is not essential because a dispersion operates satisfactorily. This amount of cuprous chloride is also equivalent to 50 p.p.m. copper based upon the amount of polymer. A third yarn sample is obtained by repeating the procedure wherein a mixture of 0.063 cupric chloride dihydrate and 0.035 gram of cuprous chloride are employed to obtain a 50 p.p.m. copper based upon the amount of polymer.

The three yarn samples obtained are individually processed into three-ply tire cords and each cord is subjected to testing in accordance with the heat stability test described immediately preceding Example 1. One yarn sample containing no copper was prepared and tested as control. The four systems tested and the analysis of data generated to test the stabilizing effect of copper on the heat stability of polyethylene terephthalate tire cored are shown in Table I as the amount in percent of its original strength.

TABLE I

| | Percent |
|---|---|
| Control | 59.8 |
| Cupric | 70 |
| Cuprous | 77 |
| Cupric-cuprous mixture | 88 |

The above data is illustrative of examples which show statistically at the ninety-five percent significance level, that the polymer containing the cuprous and cupric mixture of the two ions are significantly higher than the cuprous, cupric and control averages and, thus yield a polyester yarn significantly more stabilized when subjected to a heat stability test.

One source of degradation to which a polyester tire cord is subjected is aminolytic degradation. The cupric and cuprous ions form stable complexes with amines and ammonia substantially instantly. One cupric ion can coordinate at least up to six nitrogen atoms and, though it is not as stable upon total reaction, it is stable at normal tire operating conditions. This invention yields the necessary cupric and cuprous ions to complex the nitrogen atoms and thus diminish the aminolytic degradation and, therefore stabilizes the cord at temperatures under normal or general tire operating conditions. This effectively assists in the aminolytic stabilization of polyester cord under normal use in tires.

The inorganic copper salts of this invention are also useful in increasing the reaction rate of all aromatic dicarboxylic acids and/or the lower alkyl esters thereof with a polyol which contains 2 to about 10 carbon atoms per molecule under direct esterification or ester-interchange conditions. Examples of suitable acids utilized in the process of this invention include phthalic acid, terephthalic acid, isophthalic acid, phthalic anhydride, naphthalene dicarboxylic acid, p,p'-diphenyl dicarboxylic acid, hexahydroterephthalic acir, succinic acir, adipic acid, sebacic acid, as well as substituted acids, such as 5-sulfo-isophthalic acids as an example. Suitable polyols utilizable in accordance with this invention are the linear and alicyclic alkylene glycols having 2 to 10 carbon atoms per molecule. Such glycols include ethylene glycol, propylene glycol, butylene glycol, trimethyl glycol, tetramethylene glycol, decamethylene glycol, 1,4-cyclohexane dimethanol, 1,3-cyclobutane dimethanol and mixtures thereof. The more preferred glycols, however, are the low molecular weight glycols which contain 2 to about 4 carbon atoms since they produce highly polymerized esters having high melting points. Copolyesters, having specifically desired characteristics can also be prepared in accordance with this invention by reacting one or more of the aforedescribed acids with one or more of the aforementioned polyols. The catalysts of the instant invention are particularly suitable for reacting terephthalic acid with ethylene glycol in the presence of antimony salts.

EXAMPLE 2

Forty one and one-half pounds per hour (0.25 lb. moles/hr.) of purified terepthalic acid and 23 pounds of ethylene glycol per hour (0.37 lb. moles/hr.), 0.08 pounds per hour of diisopropylamine and 50 parts per million based on the polyester of a mixture of cupric chloride dihydrate and cuprous chloride are continuously fed to a paddle mixer where they are converted to a paste. The paste mixture is then pumped from the mixer by a feed pump to the inlet of a circulating pump. The paste mixture is pumped with 40 parts of recirculating mixture by a circulating pump through a heat exchanger where it is heated to 260° C. After leaving the heat exchanger, the mixture enters a reactor-separator which is maintained at a temperature of 260° C. by conventional Dowtherm heating means and 90 p.s.i.g. pressure by means of an automatic vent valve. The terephthalate ester, terephthalic acid, glycol-water mixture leaving this reactor is split, with part returned to the circulating pump where it is combined with fresh paste and part flowed to the first in a series of reactors where polycondensation takes place by conventional means. The pressure differential between the esterification reactor and the first polycondensation reactor causes the material to flow toward the polycondensation reactor, but a level control actuated a valve which prevents all of the effluent from taking that route in preference to the route returning to the inlet of the recirculating pump. Therefore, approximately 2.560 pounds per hour of partially esterified material are returned to the circulating pump.

The final polymer is extruded after two steps of polycondensation is extruded through a one hole die plate into a quenching water trough and into a pelletizer or spun directly into fibers or extruded into film. The improved reaction rate is shown in Table II.

TABLE II

| Catalyst | Parts per million | Overall reaction time, hours |
|---|---|---|
| None | None | 10.5 |
| Cupric-cuprous mixture | 50 | 7.0 |

The results of yarn produced from the continuous process as prepared in Example 2, also produces a heat stable yarn comparable to the results obtained from the yarn produced from the batch process as prepared in Example 1 and illustrated in Table I.

I claim:
1. A process for the preparation of a linear high molecular weight, film and fiber forming polyester, which comprise reacting an aromatic dicarboxylic acid with a polyol containing 2 to about 10 carbon atoms per molecule under direct esterification conditions in the presence of an equimolar mixture of cuprous and cupric inorganic chloride salts in an amount sufficient to catalyze said reaction and to improve the thermal and aminolytic stabilization of said polyester, and then further polycondensing said polyester until the desired viscosity is obtained.
2. A process as set forth in claim 1 wherein said process is operated continuously.
3. A process as set forth in claim 1 wherein said aromatic dicarboxylic acid is selected from the group consisting of terephthalic acid and a mixture of isophthalic acid and terephthalic acid.
4. A process as set forth in claim 1 wherein the polyol is ethylene glycol.
5. A process as set forth in claim 1 wherein said inorganic salts are added in an amount providing about 10 to about 150 parts per million of said polyester.
6. A process as set forth in claim 1 wherein the direct esterification reaction is carried out at temperatures ranging from about 200° C. to about 300° C. and at pressures ranging from about atmospheric to about 300 p.s.i.g.
7. A process as set forth in claim 1 wherein the polyol is reacted with the aromatic dicarboxylic acid in an amount ranging from about 1 to about 3 moles of polyol per mole of acid.
8. Heat stable polyethylene terephthalate polyester in the form of film and fiber made from polyethylene terephthalate polymer which has a stabilizing amount of an equimolar mixture of cuprous and cupric inorganic chloride salts incorporated therein.
9. Ammonolytically stable polyethylene terephthalate polyester in the form of film and fiber made from polyethylene terephthalate polymer in which the intrinsic viscosity of the polymer is at least 0.75 deciliter per gram and which has an ammonolytic stabilizing amount of an equimolar mixture of cuprous and cupric inorganic chloride salts incorporated therein.

References Cited

UNITED STATES PATENTS

| 3,424,727 | 1/1969 | Walker | 260—75 R |
| 3,446,766 | 5/1969 | Taylor | 260—22 |

FOREIGN PATENTS

| 907,958 | 4/1969 | Japan. |
| 926,195 | 4/1969 | Japan. |

OTHER REFERENCES

Rafikov et al., Vysokomol. Soedin. Ser. A, 11(9),2043–50 (1969).

Kirk-Othmer, Encycl. Chem. Technol. 8, 326 (1965)

MELVIN GOLDSTEIN, Primary Examiner

U.S. Cl. X.R.

260—75 R

PO-1050
(5/69)

UNITED STATES PATENT OFFICE
CERTIFICATE OF CORRECTION

Patent No. 3,696,071                Dated October 3, 1972

Inventor(s)    Brian A. Dementi

It is certified that error appears in the above-identified patent and that said Letters Patent are hereby corrected as shown below:

Column 2, line 42, "polymer" should be --polymeric--.

Column 4, line 30, "cored" should be --cord--.

Column 4, line 68, after "hydroterephthalic", "acir" should be --acid--.

Column 4, line 68, after "succinic", "acir" should be --acid--.

Column 5, line 15, "terepthalic" should be --terephthalic--.

Signed and sealed this 13th day of March 1973.

(SEAL)
Attest:

EDWARD M. FLETCHER, JR.
Attesting Officer

ROBERT GOTTSCHALK
Commissioner of Patents